United States Patent [19]
Glazkov et al.

[11] 3,893,026
[45] July 1, 1975

[54] METHOD AND APPARATUS FOR MEASURING ELECTROCHEMICAL POTENTIAL DIFFERENCE BETWEEN A METALLIC STRUCTURE AND EARTH

[76] Inventors: Vsevolod Ivanovich Glazkov, 5 Sokolinaya ul., 18, kv. 38; Viktor Gerasimovich Kotik, Flotskaya ul., 18, kv. 96; German Mikhailovich Gunin, Shebashevsky proezd, 8, kv. 91, all of Moscow, U.S.S.R.

[22] Filed: July 23, 1974

[21] Appl. No.: 491,056

Related U.S. Application Data

[63] Continuation-in-part of Ser. No. 204,822, Dec. 6, 1972.

[52] U.S. Cl. .................................. 324/72; 324/29
[51] Int. Cl. . G01r 19/00; G01r 31/00; G01n 27/00
[58] Field of Search ....... 324/1, 9, 51, 65, 29, 71 R, 324/72

[56] References Cited
UNITED STATES PATENTS
| | | | |
|---|---|---|---|
| 2,869,003 | 1/1959 | Marsh et al. | 324/71 R |
| 3,102,979 | 9/1963 | Schaschl | 324/71 R |
| 3,406,101 | 10/1968 | Kilpatrick | 324/65 CR UX |

*Primary Examiner*—Gerard R. Strecker

[57] ABSTRACT

A method of measuring an electrochemical potential difference between a metal structure and earth in the presence of stray currents with a view to eliminating an error due to the resistance effect, by measuring the difference of two potentials obtained from the metal structure under test and the main and additional electrodes, respectively, taking into account the proportionality factor between the error and the voltage across the two electrodes. A device for measuring an electrochemical potential difference between the metal structure and earth to realize said method.

3 Claims, 3 Drawing Figures

METHOD AND APPARATUS FOR MEASURING ELECTROCHEMICAL POTENTIAL DIFFERENCE BETWEEN A METALLIC STRUCTURE AND EARTH

The present application is a continuation-in-part of our application Ser. No. 204822 filed on Dec. 6, 1972, in the USA.

The present invention relates to the electrical protection of underground metallic structures against corrosion by applying a polarizing current (cathodic protection) or, more particularly, to a method of measuring an electrochemical potential difference between a metal structure in contact with earth and an earth point, set up by stray currents or cathodic protection currents.

At present, direct measurement is widely used in practice for checking the condition of electrical protection of underground metal structures against corrosion.

This method consists in connecting a high - resistance voltmeter to the surface of an underground metal structure being checked and to a non - polarizing comparison electrode which is in contact with earth at the closest possible distance from the surface under check.

This method is extensively used for checking the condition of protection of underground metal structures against corrosion caused by subterranean waters (ground electrolyte) and by stray currents of D.C. electric railways.

This prior - art method is described, in particular, in the book "Corrosion Protection of Underground Industrial Pipelines" by V. A. Pritula (Moscow, 1961, p. 195).

A disadvantage of the prior - art method of measuring the potential difference between a metal structure and earth resides in an error due to a voltage drop across the stretch of ground between the surface of the metal structure under check and the place where the comparison electrode comes in contact with earth and also due to a voltage drop across the protective insulation.

Since in practice, when physical structures are involved it is impossible to bring the point of contact of the comparison electrode sufficiently close to the metal surface and since the specific resistance of earth — and, particularly, of the insulation — is quite high, the error may attain a considerable value.

By way of example, at current densities corresponding to normal conditions of cathodic protection, Parker of the United States has found the error to be from 30 to 400 mV for an isolated pipeline — or from 30 to 60% of the potential difference applied. Schwenk of the Mannesman Co., West Germany, has estimated the error in measuring potential difference for an uninuslated metal structure (a propane tank) at 400 mV, or 50% of the potential difference applied ("Wekstoff and Korrosion," 1962, Nr.4, Seite 212–213).

The investigations have been carried out on structures polarized with a potential of 900—1300 mV.

In the presence of stray currents, the difference of potential between a metal structure and earth may rise to over 3.5 V so that the error will be still larger.

Because of this error which tends to increase the measured value, actual potentials are lower than the measured ones. The error cannot be avoided in practical measurements by the existing methods. Failure to take this error into account results in inadequate corrosion protection of metal structures if their surface is not insulated, or in an unjustifiable increase in the number of cathodic protection units required for extended insulated metal structures (pipelines). It is practically unfeasible to avoid this error with the prior-art method of direct measurement.

This is because under physical conditions it is impossible not only to place the comparison electrode close enough to the metal surface, as was stated above, but also to isolate the electrochemical potential difference out of the sum-total of voltage drops. Thus, elimination of the error is a technical problem. To solve this problem, indirect methods based on the time lag of electrochemical processes have been suggested.

A specific feature of such methods is in that they use either an interrupter in the source of cathodic protection polarization current or an A.C. generator, for instance, a pulse generator, as a source of polarizing current.

These methods include:
the Pearson method described in the journal "Transactions of the Electrochemical Society" No. 81, 1942, p. 485;
the Holler method described in the journal "Werkstoff and Korrosion," 1962, H.4, p. 216.

While differing in details, these devices always contain an A.C. voltage generator (or an interrupter), an anode (earthing) electrode, a comparison electrode, and a measuring circuit made as an A.C. bridge using a pulse cathode voltmeter as an indicator.

A major disadvantage of the above methods lies in that a special source must be used which converts direct current into pulse current at a sufficient frequency.

An interrupter or an A.C. generator interferes with electric corrosion protection. The potential measured before and after the application of pulse current will differ.

The use of generators or interrupters operating at a sufficiently high frequency is complicated by large polarizing currents (up to 50 A) and also by reactances in the cathodic protection unit.

Using the prior-art methods, it is practically impossible to avoid said error in measuring the potential difference when polarizing currents are stray currents in the earth. Finally, measurements using said methods require high-power auxiliary equipment (a generator or an interrupter), although the meter itself may be small in size and compact.

The prior-art methods are time-consuming and require skilled personnel.

It is an object of the present invention to avoid the above disadvantages.

It is another object of the present invention to provide a method which avoids said error in measuring the potential difference between a metal structure and earth without making use of devices that change in any way the polarization conditions.

It is a further object of the invention to provide a device which realizes said method and ensures maximum automation of all the operations.

With these objects in view, according to the present invention, there is provided a method of measuring the electrochemical potential difference between a metal structure in contact with earth and an earth point in the presence of stray currents and cathodic protection currents, consisting in that two comparison electrodes are placed in the earth, the main electrode comparison being arranged at said earth point and the additional comparison electrode at a point more remote from the metal structure; then a first voltage is measured which is a difference of potential between the metal structure and the main comparison electrode; a second voltage is measured which is a difference of potential between the main comparison electrode and the additional comparison electrode; said first and second voltages are applied to the input of an analogue device so that when stray current and cathodic protection currents appear, the analogue device produces output signals the magnitudes of which are proportional to the time derivatives of the first and the second voltages.

Then, the proportionality factor is determined by dividing the magnitude of the signal proportional to the first voltage derivative by the magnitude of the voltage proportional to the second voltage derivative; said second voltage is applied to a corrector unit and said corrector unit is adjusted so as to produce an output voltage the ratio of which to the corrector input voltage equals to said proportionality factor; said first voltage between the metal structure and the main electrode is delivered in phase opposition with said output corrector voltage, to a voltmeter, and the measured potential difference is read directly off the voltmeter scale.

The device for measuring an electrochemical potential difference between a metal structure in contact with earth and an earth point comprises; a main comparison electrode and an additional comparison electrode placed in the earth, said main electrode being located at said earth point and the additional comparison electrode, at a point more remote from said metal structure;

a corrector unit containing an amplifier with the input thereof connected to said electrodes and an attenuator placed in series with the amplifier, the input of said amplifier serving as the input of the corrector unit, and the attenuator output being used as the output of the corrector unit;

a first comparison unit the input of which is connected to said metal structure and to the main comparison electrode, comprising a differentiating amplifier which converts the rate of change of the input voltage into a proportional output voltage pulse, the amplifier input being the input of the first comparison unit;

a multi-step voltage discriminator which has its input connected to the output of said differentiating amplifier and which serves for converting the input pulse amplitude into a proportional number of output pulses of an equal amplitude;

a counter for registering and displaying the number of pulses whose input is connected through a matching circuit to the output of said voltage discriminator;

a second comparison unit with the input thereof connected to said main and additional comparison electrodes, which comprises a differentiating amplifier that converts the rate of change of the input voltage into a proportional output voltage pulse, the input of said amplifier serving as the input of the second comparison unit;

a multi-step voltage discriminator which has its input electrically coupled to the output of said differentiating amplifier and which serves for converting the input pulse amplitude into a proportional number of output pulses of an equal amplitude;

a counter for registering and displaying the number of pulses whose input is connected through a matching circuit to the output of said voltage discriminator;

a voltmeter one terminal of which is connected to said metal structure and the other is connected in series with the corrector unit output to said main comparison electrode.

Other objects and advantages of the present invention will be made clear from the following description when read with reference to the accompanying drawings, wherein.

The method of measuring a potential difference between a metal structure and earth at a check point consists in that in order to measure the potential at any underground structure (for instance, a pipeline), with respect to said check point in the earth, a comparison electrode (made of copper sulphade) called a main electrode, is placed at said check point, and a second comparison electrode, called an additional electrode, is positioned at a certain distance (10–15 m) from the first electrode.

A first voltage obtained will be the potential difference between the metal structure and the main comparison electrode.

A second voltage will be obtained as the difference of potential between the main and the additional comparison electrodes.

The first and the second voltages are applied to the input of an analogue device which produces output pulses whose magnitude or number is proportional to the time derivatives of said voltage.

The voltages are measured under the conditions of variations of current flowing in the earth, these variations giving rise to surges of said first and second voltages between the electrodes. These surges are differentiated by a device which gives out two kinds of signals, proportional to the first and second voltage derivatives, respectively. Using the magnitudes of the signals obtained, the first value is divided mathematically by the second, and a proportionality factor is obtained. In accordance with this proportionality factor, the corrector unit is adjusted so that its output voltage is equal to the input voltage times the proportionality factor. Numerically, this voltage is equal to the eliminated error, therefore, in further text its will be called a correction voltage. Then, the first voltage which is the potential difference between the main electrode and the metal structure is applied in opposition with the correction voltage at the output of the corrector unit, to a measuring voltmeter.

The numerical value indicated by the voltmeter is the magnitude of the measured potential.

Figure 1:
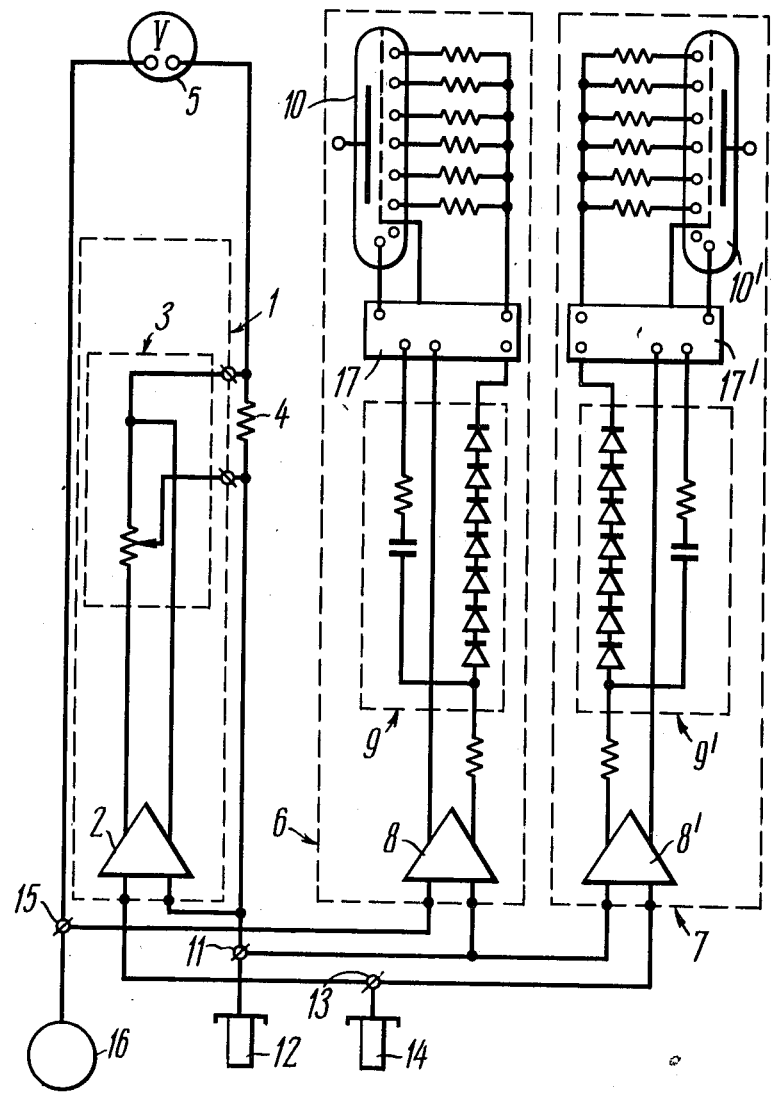
FIG. 1 shows one of embodiments of the device for measuring an electrochemical potential difference between an underground metal structure and a point of earth, according to the present invention.
Figure 2:
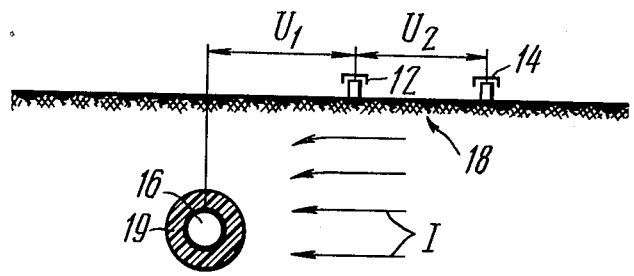
FIG. 2 is a circuit diagram showing the layout of electrodes with respect to the metal structure.

The validity of the method disclosed herein can be demostrated by measuring the difference of potential between a ground-buried steel pipeline 16 (FIG. 2) affected by a stray current field, and a preset point.

For measurement, two identical comparison electrodes are placed on the earth surface, one electrode 12 at a preset earth point and another electrode 14 at a point more remote from the pipeline.

Stray current $I$ between the electrode 12 and the pipeline 16 set up a potential difference $u_1$; likewise, a voltage drop in earth caused by the stray currents $I$ passing between the electrode 12 and the electrode 14 sets up a potential difference $u_2$.

The potential difference $u_1$ between the electrode 12 and the pipeline 16 includes the electrochemical potential proper $u_x$ to be measured and a voltage drop in an earth layer (designated by reference numeral 18) and an insulation coating 19. If the average density of the current flowing between the pipeline 16 and the electrode 12 is denoted as $j_1$, then $u_1 + u_x + j_1 R_o$, where $R_o$ is the effective resistance of the earth and the insulation between the pipeline 16 and the electrode 12.

The electrochemical potential difference to be determined will be $u_x = u_1 - j_1 R_o$.

As the current density $j_1$ and a density $j_2$ of current in a stretch of ground between the electrodes 12 and 14 are each proportional to the current $I$, their ratio may be assumed constant for a given ground, a given insulation and a given layout of the electrodes, in other words.

$$(j_1/j_2) = K_1.$$

If the effective resistance between the points at which the electrodes 12 and 14 are installed is designated $R_1$, the ratio of $R_1$ to $R_o$ will be constant for a given place and time of measurement, i.e.

$$(R_o/R_1) = K_2.$$

In view of the above, it can be assumed that $(j_1 R_o/j_2 R_1) = K$, where $K$ is a proportionality factor, and, therefore, since $u_2 = j_1 R_1$, if $K$ is known and $u_2$ is measured, we may find $j_1 R_o = u_2 K$.

Then, the unknown potential, $u_x$ will be given by $$u_x = u_1 - u_2.K.$$

For determining $K$, use is made of current variations which always occur in the presence of stray currents.

When variations of the stray currents $I$ take place, the current densities $j_1$ and $j_2$ will change accordingly in proportion with $I$.

If at these time instants a rate of voltage change $(du_1/dt)$ between the pipeline 16 and the electrode 12 as well as a rate of voltage change between electrodes 12 and 14 $(du_2/dt)$ are measured, it will be found that $(du_2/dt) = R_1 (dj_2/dt)$ and $(du_1/dt) = R_o (dj_1/dt) + (du_x/dt)$.

On account of a time lag due to electrochemical capacitance at the metal-earth interface at sudden changes of the current $I$ and the current density $j$, $(du_x/dt) \rightarrow 0$, and, therefore, the rate of change of $u_1$ will be $du_1/dt \rightarrow R_o (dj_1/dt)$. At the same time, since $R_o (dj_1/dt) = K_1 R_I (dj_2/dt)$, or $(dj_1/dt) = K dj2/dt$, then $$K = (dj_1/dj_2/dt) = (du_1/dt)/(du_2/dt),$$

in other words, measuring the ratio $(du_1/dt)/(du_2/dt)$ gives $K$ and if we know $K$ and measure $u_2$, then $u_1$ may be obtained and thus the electrochemical potential difference to be determined is $$u_x = u_1 - u_2 . K.$$

A device for measuring the electrochemical potential difference between an underground metal structure and an earth point comprises a corrector unit 1 made up of an amplifier 2 with the output thereof connected to the input of an attenuator 3 having a load resistor 4 and a voltmeter 5 at its output.

The input of the amplifier 2 of the corrector unit 1 is electrically coupled to a terminal 11 of the main comparison electrode 12 and to a terminal 13 of the additional comparison electrode 14.

A first comparison unit 6 and a second comparison unit 7 contain each a differentiating amplifier 8 or 8', respectively, a multi-step voltage discriminator 9 or 9', respectively, a matching circuit 17 or 17', and an indicating pulse counter 10 or 10'. The input of the comparison unit 6 or 7 is the input of an appropriate differentiating amplifier 8 or 8', respectively, whose output is electrically connected to the input of a corresponding multi-step voltage discriminator 9 or 9', for example, a discriminator built around tunnel diodes.

The output of the discriminator 9 or 9' is connected to the input of the corresponding pulse counter 10 or 10' through the matching circuit 17 or 17', respectively.

The input of the amplifier 8 of the comparison unit 6 is electrically connected to a terminal 15 of the metal structure being checked and to the terminal 11 of the main comparison electrode 12.

The input of the amplifier 8' of the comparison unit 7 is electrically connected to the terminal 11 of the main comparison electrode 12 and the terminal 13 of the additional comparison electrode 14.

The voltmeter 5 is connected in series with the metal structure 16 being checked, the load resistance 4, and the main comparison electrode 12.

The device of the present invention operates as follows.

As long as there is no current flowing between the underground metal structure 16 and an external source of polarizing current (not shown in the drawing), the voltmeter 5 reads only the electrochemical potential difference between the structure and the earth, because a voltage drop across the resistor 4 which is the output of the attenuator 3 can be neglected owing to the high-resistance input of the voltmeter 5.

When a polarizing current begins to flow in the earth from or to the metal structure, a potential difference is set up between the electrodes 12 and 14. This difference is applied to the input of the corrector unit 1 and acts upon the input of the amplifier 2, causing a correction voltage to appear across the resistor 4. The correction voltage is sent to the input of the voltmeter 5 in antiphase with an e.m.f. induced between the metal structure 16 and the main comparison electrode 12. As a result, a correction voltage value is continuously subtracted from the potential difference between the comparison electrode 12 and the structure 16.

The proportionality factor which defines the ratio of the correction voltage (introduced from the corrector unit output) to the voltage arising between the comparison electrodes 12 and 14, is determined by means of the comparison units 6 and 7, the voltage set up across the comparison electrode 12 and the structure 16 being furnished to the input of the amplifier 8 of the comparison unit 6, and the voltage induced across the electrodes 12 and 14 going to the input of the amplifier 8' of the comparison unit 7.

These amplifier 8 and 8' are so designed that they responds only to a quickly varying input voltage, but do not respond to a constant-level voltage applied to their inputs.

When varying voltages come to the inputs of the amplifiers 8 and 8', the amplifiers produce output voltages which will be proportional to the time derivatives of input voltage variations. The flow of stray currents in the earth is always accompanied by fast pulsations at the background of slower changes, while cathodic protection is mainly effected by reactifiers whose output current pulsates periodically.

It is obvious that a sudden surge of current flowing in the earth from or to the metal structure causes similar changes in the voltage drop between the comparison electrodes 12 and 14 and the potential difference between the comparison electrode 12 and the metallic structure 16.

These voltage changes applied to the inputs of the comparison units 6 and 7 are converted at the outputs of the amplifiers 8 and 8' into pulses, the magnitudes of which vary in proportion with the time derivatives at surge moments (or, which is the same, into pulses whose magnitudes are proportional to the rise time of input signals).

The pulses thus obtained go to the inputs of two voltage discriminators 9 and 9', each of which isolates input pulses reaching a preset level and produces a number of output pulses corresponding to the input pulses of this preset level.

This is made possible by the fact that after the input pulse attains a level corresponding to one operating threshold value, one pulse is generated at the output, and since a plurality of possible operating threshold values are provided (depending on a required sampling rate), while the number of these threshold values is determined by the magnitude of the input pulse, the voltage discriminators produce a train of output pulses whose number corresponds to the mangnitude of the input pulse.

For generating reading pulses, use can be made of priorart voltage discriminators, such as discriminators built around tunnel diodes, transistors and others. Analogue comparison of pulses produced at the amplifier outputs can also be employed.

The output pulses of the discriminators 9 and 9' pass via the matching circuits 17 and 17' into the indicating counters 10 and 10' which may be of any known type.

The indicating counters shown in the diagram use dekatrons. In these counters which have thhe same counting capacity, pulses delivered through an appropriate matching circuit fire corresponding electrodes and maintain them in this state during conduction.

As soon as all the electrodes are fully fired in one of the indicators intended for registering a higher level, the counters are interlocked and stop counting. In case a voltage variation pulse between the comparison electrodes 12 and 14 (12 and 16, respectively) is interrupted before the counting capacity of the counters has been completely filled up, the electrodes of the indicating counter that remain fired are sufficient for determining the proportionality factor.

Fired electrodes in the indicator tubes can be visually observed and read out, and then the proportionality factor is found by mathematical division of the number of pulses at the output of the counter 10 by the number of pulses at the output of the counter 10'.

After that, the attenuator 3 is regulated to adjust the corrector unit so that its output-to-input voltage ratio equals a proportionality factor found as described above. With a constant layout of the comparison electrodes 12 and 14 relative to the metal structure 16, this adjustment remains unchanged for all the subsequent measurements carried out with continuously introduced correction voltage.

Figure 3:
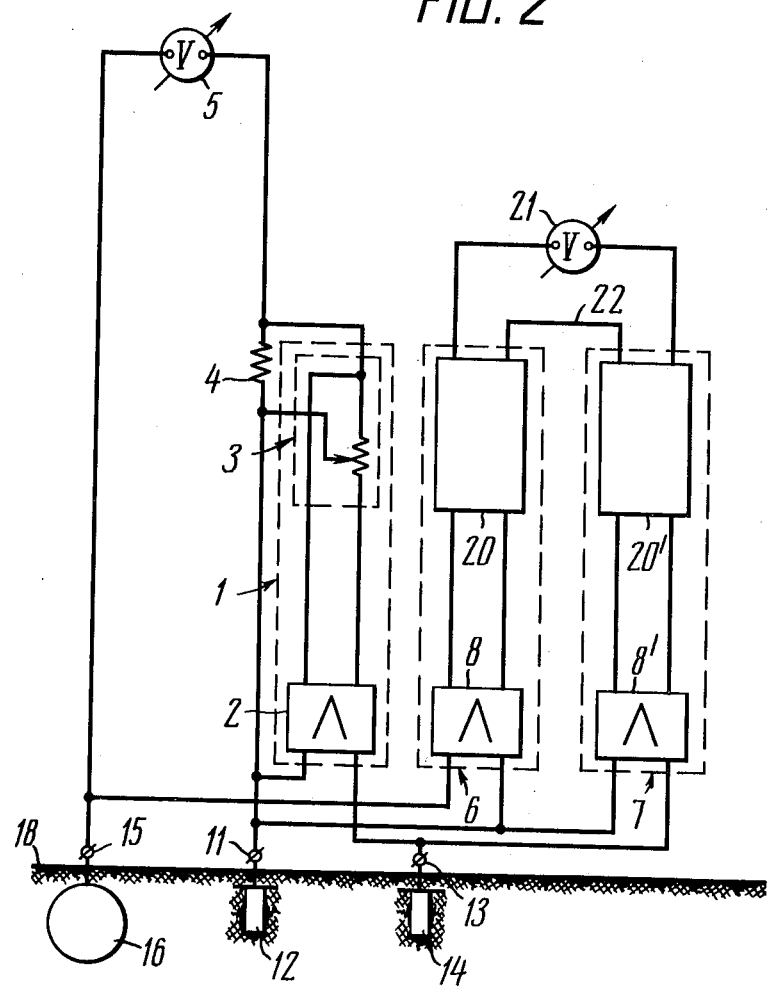
FIG. 3 is another embodiment of the device for measuring the electrochemical potential difference between the underground metal structure and earth, according to the present invention.

Another embodiment of a device for measuring an electrochemical potential difference between an underground metal structure and a point on the earth surface comprises a corrector unit I (FIG.3) made up of an amplifier 2 whose output is connected to the input of an attenuator 3 with a load resistor 4 at its output.

A first comparison unit 6 and a second comparison unit 7 contain each an A.C. amplifier 8 or 8', respectively, an attenuator 20 or 21' and a null-indicator 21.

The amplifier 2 is connected through terminals 11, 13 to a main comparison electrode 12 and an additional comparison electrode 14.

The input of the amplifier 8 which serves as the input of the comparison unit 6 is electrically connected through a terminal 15 to a metal structure 16 being checked and through a terminal 11 to the main comparison electrode 12. The output of the amplifier 8 is connected to the input of the attenuator 20, the output of which is the output of the first comparison unit 6. One pole of the first unit output is connected to the null-indicator 21, and the other pole to an appropriate output pole of the second comparison unit.

The input of the amplifier 8' which is the input of the comparison unit 7 is electrically coupled through the terminal II to the main comparison electrode 12 and through the terminal 13 to the additional comparison electrode. The output of the amplifier 8' is connected to the input of the attenuator 21 whose output is the output of the comparison unit 7.

One output pole of the second comparison unit 7 is connected to the null-indicator 21 and the other pole is coupled by means of a wire 22 to an appropriate output pole of the first comparison unit 6 so that the output voltages are in phase.

A voltmeter 5 is connected in series between the metal structure 16 and the load resistor 4.

The device operates as follows. A first voltage set up across the metal structure 16 and the main electrode 12 is applied to the input of the first comparison unit 6, and a second voltage induced across the main electrode 12 and the additional electrode 14 goes to the input of the second comparison unit 7.

These voltages are determined by the ripple of stray current in the earth or cathodic protection currents.

Further, said voltages are sent to the amplifiers 8 and 8', respectively, which isolate the A.C. component of the input voltage and amplify it. Then, the amplified voltage goes to the input of the calibrating attenuator 20 on 20', respectively, where its magnitude is attenuated according to the adjustment made.

The output voltages of the comparison units are applied in phase opposition to the null-indicator.

By varying the adjustment of the attenuators 20 and 20', it is possible to make voltage at the indicator 21 vanish when pulsations of the stray currents or cathodic protection currents appear.

At an instant when the indicator 21 reads zero, the gain of the first comparison unit 6 and the second comparison unit 7 is determined. Since a stable gain is provided in the amplifiers 8 and 8', the total gain of the unit 6 or 7 depends on the attenuators 20 and 20'.

Then, a proportionality factor is found by dividing the gain of the comparison unit 6 by that of the comparison unit 7, and the corrector unit 1 is adjusted according to this proportionality factor. As a result, voltage between the metal structure 16 and the main electrode 12, and output voltage of the corrector unit 1 is delivered in phase opposition to the voltmeter 5, and the voltmeter 5 indicates the actual electrochemical potential difference between the metal structure 16 and the earth point at which the main comparison electrode is placed.

The devices described above carry into effect the principles underlying the method of measuring an electrochemical potential difference of the present invention.

What is claimed is:

1. A method of measuring an electrochemical potential difference arising between a metal structure in contact with earth and an earth point in the presence of stray currents and cathodic protection currents, comprising: placing two comparison electrodes in the earth, a main comparison electrode being located at said earth point and an additional comparison electrode at a point more remote from the metal structure;
   obtaining a first voltage as a potential difference between the metal structure and the main comparison electrode; obtaining a second voltage as a potential difference across the main and the additional comparison electrodes; applying said first and second voltages to the input of an analogue device which produces signals varying in proportion with the time derivatives of the first and second voltages at periods when variations of stray current and cathodic protection current occur;
   determining a proportionality factor by dividing the magnitude of a signal proportional to the first voltage derivative by the magnitude of a signal proportional to the second voltage derivative; injecting said second voltage into the input of a corrector unit; adjusting said corrector unit so as to produce an output voltage whose magnitude divided by the input voltage magnitude equals said proportionality factor;
   applying said first voltage between the metal structure and the main electrode to a voltmeter in antiphase with said voltage obtained at the output of the corrector unit;
   whereby, the result of the measurement of an electrochemical potential difference is read directly off the voltmeter scale.

2. A device for measuring an electrochemical potential difference between a metal structure in contact with earth and an earth point, comprising: a main comparison electrode and an additional comparison electrode placed into the earth, said main electrode being positioned at said earth point and said additional electrode at a point more remote from the metal structure;
   a corrector unit, comprising an amplifier with the input thereof connected to said electrodes; an attenuator connected in series with said amplifier, the input of said amplifier serving as the input of said corrector unit, and the output of said attenuator being used as the output of said corrector unit;
   a first comparison unit the input of which is connected to said metal structure and said main comparison electrode, comprising: a differentiating amplifier converting the rate of change of the input voltage into a proportional output voltage pulse, the input of said amplifier being the input of said first comparison unit;
   a multi-step voltage discriminator which has its input connected to the output of said differentiating amplifier and which serves for converting the input pulse amplitude into a proportional number of output pulses of an equal amplitude;
   a matching circuit;
   a counter for registering and displaying the number of pulses, with its input connected through said matching circuit to the output of said discriminator;
   a second comparison unit the input of which is connected to said main and additional comparison electrodes, containing: a second differentiating amplifier converting the rate of change of the input voltage into a proportional output voltage pulse, the input of said amplifier being the input of said second comparison unit;
   a second multi-step voltage discriminator which has its input electrically connected to the output of said differentiating amplifier and which serves for converting the input pulse amplitude into a proportional number of output pulses of an equal amplitude;
   a second matching circuit;
   a second counter for registering and displaying the number of pulses, with its input connected through said matching circuit to the output of said discriminator;
   a voltmeter wherein one terminal is connected to said metal structure and the other terminal connected in series with the output of said corrector unit to said main comparison electrode.

3. A device for measuring an electrochemical potential difference between a metal structure in contact with earth and an earth point, comprising a main comparison electrode and an additional comparison electrode placed on the earth surface, said main comparison electrode being disposed at said earth point and said additional comparison electrode located at a point more remote from said metal structure;
   a corrector unit comprising an amplifier with the input thereof connected to said electrodes, and an attenuator placed in series with said amplifier, the input of said amplifier serving as the input of said corrector unit and the attenuator output being the output of said corrector unit;
   a first comparison unit the input of which is connected to said metal structure and said main comparison electrode, comprising an A.C. amplifier which isolates and amplifies the A.C. component proportional to the input voltage derivative, the input of said amplifier serving as the input of said first comparison unit, and an attenuator of this unit whose input is connected to the output of said amplifier and which is used for regulating voltage at the output of said first comparison unit;
   a second comparison unit the input of which is connected across said main comparison electrode and said additional comparison electrode, comprising a second A.C. amplifier which isolates and amplifies the A.C. component proportional to the input voltage derivative, the input of said amplifier serving as the input of said second comparison unit, and a second attenuator whose input is connected to the output of said amplifier and which is used for regulating voltage at the output of said second comparison unit;

a null-indicator connected across the outputs of the first and second comparison units so as to indicate a voltage difference at the outputs of said first and second comparison units;

a voltmeter wherein one terminal is connected to said metal structure and the other terminal connected in series with the output of said corrector unit to said main comparison electrode.

* * * * *